(12) United States Patent
Isogawa et al.

(10) Patent No.: US 10,863,384 B2
(45) Date of Patent: Dec. 8, 2020

(54) INTERFACE METHOD BETWEEN CENTRAL AGGREGATE APPARATUS AND EXTENSION APPARATUS, AND RADIO CONTROL SYSTEM

(71) Applicant: NTT DOCOMO, INC., Tokyo (JP)

(72) Inventors: Takayuki Isogawa, Tokyo (JP); Naoto Ookubo, Tokyo (JP); Takahiro Takiguchi, Tokyo (JP); Tooru Uchino, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/091,485

(22) PCT Filed: Mar. 24, 2017

(86) PCT No.: PCT/JP2017/012054
§ 371 (c)(1),
(2) Date: Oct. 4, 2018

(87) PCT Pub. No.: WO2017/175606
PCT Pub. Date: Oct. 12, 2017

(65) Prior Publication Data
US 2019/0116524 A1 Apr. 18, 2019

(30) Foreign Application Priority Data
Apr. 8, 2016 (JP) ................. 2016-078502

(51) Int. Cl.
*H04W 28/18* (2009.01)
*H04W 24/10* (2009.01)
(Continued)

(52) U.S. Cl.
CPC .......... *H04W 28/18* (2013.01); *H04L 5/0035* (2013.01); *H04W 24/10* (2013.01); *H04W 28/16* (2013.01);
(Continued)

(58) Field of Classification Search
CPC ..... H04W 28/18; H04W 28/16; H04W 92/16; H04W 72/085; H04W 487/2121;
(Continued)

(56) References Cited

U.S. PATENT DOCUMENTS

| 8,520,616 B2* | 8/2013 | Cui ...................... H04L 5/0035 370/329 |
| 8,938,247 B2* | 1/2015 | Gorokhov ............. H04L 5/0048 455/452.1 |

(Continued)

FOREIGN PATENT DOCUMENTS

EP 2739105 A1 6/2014

OTHER PUBLICATIONS

International Search Report issued in PCT/JP2017/012054 dated May 30, 2017 (1 page).

(Continued)

*Primary Examiner* — Sharad Rampuria
(74) *Attorney, Agent, or Firm* — Osha Bergman Watanabe & Burton LLP

(57) ABSTRACT

An interface method between a central-aggregate apparatus and an extension apparatus is provided, which includes: transmitting, by the central-aggregate apparatus, uplink signal indication information for a user equipment and an identifier of the user equipment to the extension apparatus; retaining, by the extension apparatus, the identifier and uplink signal information extracted from the received uplink signal indication information and transmitting an uplink signal indication to the user equipment; receiving an uplink signal transmitted from the user equipment based on one or both of the retained uplink signal information and identifier; extracting data information from the uplink signal, estimating uplink communication quality based on the uplink signal, and transmitting one or both of the extracted data (Continued)

information and the estimated uplink communication quality to the central-aggregate apparatus; and receiving, by the central-aggregate apparatus, one or both of the data information and the uplink communication quality from the extension apparatus.

12 Claims, 8 Drawing Sheets

(51) Int. Cl.
  H04W 88/06      (2009.01)
  H04W 92/16      (2009.01)
  H04W 28/16      (2009.01)
  H04L 5/00       (2006.01)
  H04W 72/08      (2009.01)
  H04W 92/18      (2009.01)
(52) U.S. Cl.
  CPC ......... *H04W 72/085* (2013.01); *H04W 88/06* (2013.01); *H04W 92/16* (2013.01); *H04W 92/18* (2013.01)
(58) Field of Classification Search
  CPC ..... H04W 72/04; H04W 72/12; H04W 76/00; H04W 88/06; H04W 24/10; H04W 92/18; H04L 5/0035; H04B 7/2121; H04B 7/2123; H04J 2203/0069; H04Q 2213/394
  See application file for complete search history.

(56) References Cited

U.S. PATENT DOCUMENTS

| | | | |
|---|---|---|---|
| 9,094,855 B2* | 7/2015 | Etemad | H04W 24/10 |
| 2012/0218962 A1* | 8/2012 | Kishiyama | H04B 7/0452 |
| | | | 370/329 |
| 2013/0329660 A1* | 12/2013 | Noh | H04L 5/0035 |
| | | | 370/329 |
| 2015/0023278 A1 | 1/2015 | Boccardi et al. | |

OTHER PUBLICATIONS

Written Opinion of the International Searching Authority issued in PCT/JP2017/012054 dated May 30, 2017 (4 pages).
NTT Docomo, Inc.; "5G Vision for 2020 and Beyond"; 3GPP RAN workshop on 5G, RWS-150051; Phoenix, AZ, USA; Sep. 17-18, 2015 (23 pages).
Nokia; "Nokia Vision & Priorities for Next Generation Radio Technology"; 3GPP RAN workshop on 5G, RWS-150010; Phoenix, AZ, USA; Sep. 17-18, 2015 (17 pages).
Extended European Search Report issued in counterpart European Patent Application No. 17778985.6, dated Sep. 27, 2019 (11 Pages).

* cited by examiner

INTERFACE METHOD BETWEEN CENTRAL AGGREGATE APPARATUS AND EXTENSION APPARATUS, AND RADIO CONTROL SYSTEM

TECHNICAL FIELD

The present invention relates to a radio communication system.

BACKGROUND ART

In long term evolution (LTE) systems and LTE-advanced systems, a technology referred to as a centralized-radio access network (C-RAN) capable of accommodating many cells while suppressing apparatus cost is known to efficiently support areas such as hot spots in which traffic is high.

C-RAN is configured to include one or more remotely installed base stations referred to as remote units (RUs) and a base station referred to as a digital unit (DU) and centrally controlling the RUs. A DU of the related art has functions of Layer 1 to Layer 3 which a base station has. An orthogonal frequency division multiplexing (OFDM) signal generated by a DU is sampled and transmitted to an RU, and then is transmitted from a radio frequency (RF) functional unit included in the RU.

CITATION LIST

Non-Patent Document

Non-Patent Document 1: RWS-150051
Non-Patent Document 2: RWS-150010

SUMMARY OF THE INVENTION

Problem to be Solved by the Invention

Next, the configuration of a C-RAN examined in 5G will be described. In FIG. 1, a 4G-DU and a 4G-RU mean a DU and an RU which have functions of LTE-advanced (including functions of LTE). Further, a 5G-DU and a 5G-RU mean a DU and an RU which have functions of 5th generation (5G) radio technologies. The 4G-DU and the 5G-DU are connected by extended interfaces of X2-AP and X2-U interfaces in LTE. A network circuit connecting the DU to the RU is referred to as a fronthaul (FH). In LTE, a common public radio interface (CPRI) is used in the FH.

In current LTE, it is assumed that functions of Layer 1 (physical layer: L1) and Layer 2 (medium access control (MAC), radio link control (RLC), and packet data convergence protocol (PDCP): L2) are mounted on a DU side.

In 5G which is currently under examination, a peak rate equal to or greater than 10 Gbps and new low delay are expected to be realized. Hence, when 5G is introduced, a band necessary for an FH is considerably increased with an improvement in a peak rate. Accordingly, it is examined to reduce an amount of information transmitted with an FH by realizing some of the layers mounted on a DU on an RU side. To determine which layer functions are realized on an RU side, various variations can be considered.

For example, a plan to realize some or all of the functions of Layer 1 which a DU has in an RU has been examined. Thus, since a radio physical layer function is realized in an RU, a required transmission band in a fronthaul can be reduced. On the other hand, from the viewpoint of inter-cell coordination, it is desirable to realize a MAC scheduler function in a DU. However, in order for the MAC scheduler function to perform appropriate PUSCH scheduling and signal combination, it is necessary to coordinate with an L1 functional unit that acquires and measures radio channel quality. Therefore, it is necessary to transmit and receive necessary control information via a fronthaul between a MAC functional unit of a DU and an L1 functional unit of an RU.

In a DU of the related art, a MAC functional unit and an L1 functional unit are in a single apparatus. Therefore, information for uplink transmission from a user equipment (UE) can be easily transmitted and received between the L1 functional unit and the MAC functional unit. As described above, however, when an L1 functional unit and a MAC functional unit are separated to an RU and a DU, it is considered that transmission and reception of information for uplink transmission is difficult or inefficient depending on a circuit connecting the DU to the RU.

In view of the above-described problems, an object of the invention is to provide an interface for realizing efficient scheduling of uplink transmission between an RU that has a radio physical layer function and a DU that has a scheduling function.

Means for Solving Problem

To resolve the foregoing problems, an aspect of the invention relates to an interface method between a central aggregate apparatus and an extension apparatus. The method includes: transmitting, by the central aggregate apparatus, uplink signal indication information for a user equipment and an identifier of the user equipment to the extension apparatus; retaining, by the extension apparatus, the identifier and uplink signal information extracted from the received uplink signal indication information and transmitting an uplink signal indication to the user equipment; receiving an uplink signal transmitted from the user equipment based on one or both of the retained uplink signal information and identifier by the extension apparatus; extracting data information from the uplink signal, estimating uplink communication quality based on the uplink signal, and transmitting one or both of the extracted data information and the estimated uplink communication quality to the central aggregate apparatus by the extension apparatus; and receiving, by the central aggregate apparatus, one or both of the data information and the uplink communication quality from the extension apparatus.

Another aspect of the invention relates to a radio network control system including: a central aggregate apparatus configured to execute a scheduling function; and an extension apparatus configured to perform a radio physical layer function. The central aggregate apparatus includes a scheduling unit configured to schedule a resource for a user equipment, and a first fronthaul interface unit configured to provide an interface to the extension apparatus. The extension apparatus includes a second fronthaul interface unit configured to provide an interface to the central aggregate apparatus, and a radio control unit configured to control radio communication with the user equipment. The first fronthaul interface unit transmits uplink signal indication information and an identifier of the user equipment to the second fronthaul interface unit with respect to uplink transmission scheduled for the user equipment by the scheduling unit. The second fronthaul interface unit receives the uplink signal indication information and the identifier and extracts uplink signal information from the uplink signal indication information. The radio control unit retains the extracted uplink signal information and the identifier, transmits an uplink signal indication to the user equipment, and receives an uplink signal transmitted from the user equipment based on one or both of the retained uplink signal information and identifier. The second fronthaul interface unit extracts data information from the uplink signal, estimates uplink communication quality based on the uplink signal, and transmits one or both of the extracted data information and the estimated uplink communication quality to the first fronthaul interface unit. The first fronthaul interface unit receives one or both of the data information and the uplink communication quality from the extension apparatus.

Effect of the Invention

According to the invention, it is possible to provide an interface for realizing efficient scheduling of uplink transmission between an RU that has a radio physical layer function and a DU that has a scheduling function.

MODE(S) FOR CARRYING OUT THE INVENTION

Hereinafter, an embodiment of the invention will be described with reference to the drawings.

The following embodiment discloses a radio network control system that includes a central aggregate apparatus functioning as a DU that has a scheduling function and an extension apparatus functioning as an RU that has a radio physical layer function.

When an embodiment to be described below is summarized, when the central aggregate apparatus transmits uplink signal indication information for a user equipment and an identifier of the user equipment to the extension apparatus, the extension apparatus retains the identifier and uplink signal information extracted from the received uplink signal indication information and transmits an uplink signal indication to the user equipment. Here, the uplink signal information may be any information used for uplink transmission by the user equipment. When the extension apparatus receives an uplink signal transmitted from the user equipment based on the retained uplink signal information and identifier, the extension apparatus extracts data information from the uplink signal and estimates uplink communication quality based on the uplink signal. The extension apparatus transmits one or both of the extracted data information and the estimated uplink communication quality, and the central aggregate apparatus receives the data information and schedules the uplink transmission with respect to the user equipment subsequently based on the received uplink communication quality. In this way, the central aggregate apparatus can schedule appropriate uplink transmission for the user equipment based on the uplink communication quality acquired from the extension apparatus.

Figure 1:
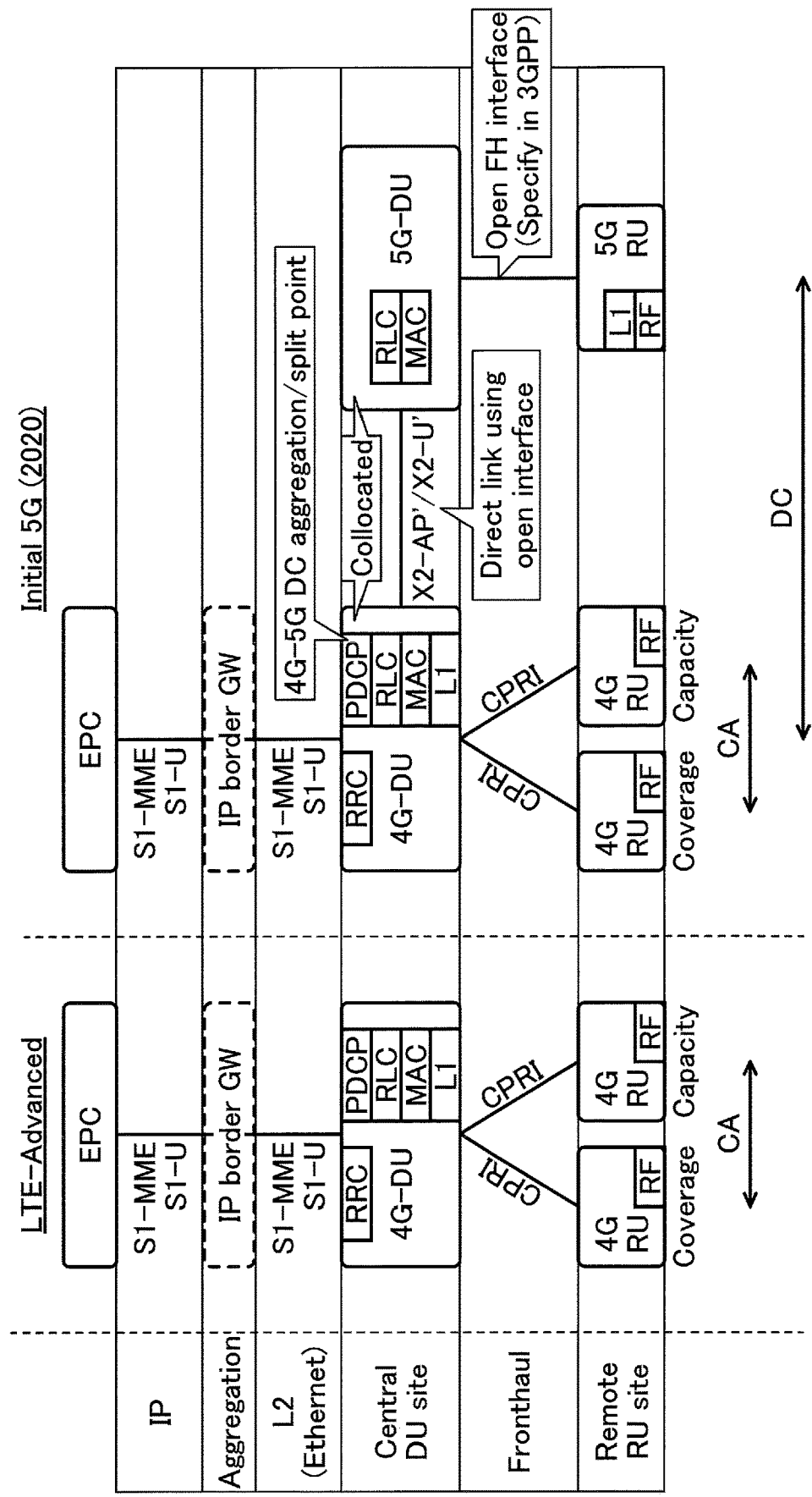
FIG. 1 is a diagram illustrating a configuration example of C-RAN examined in 5G.
Figure 2:
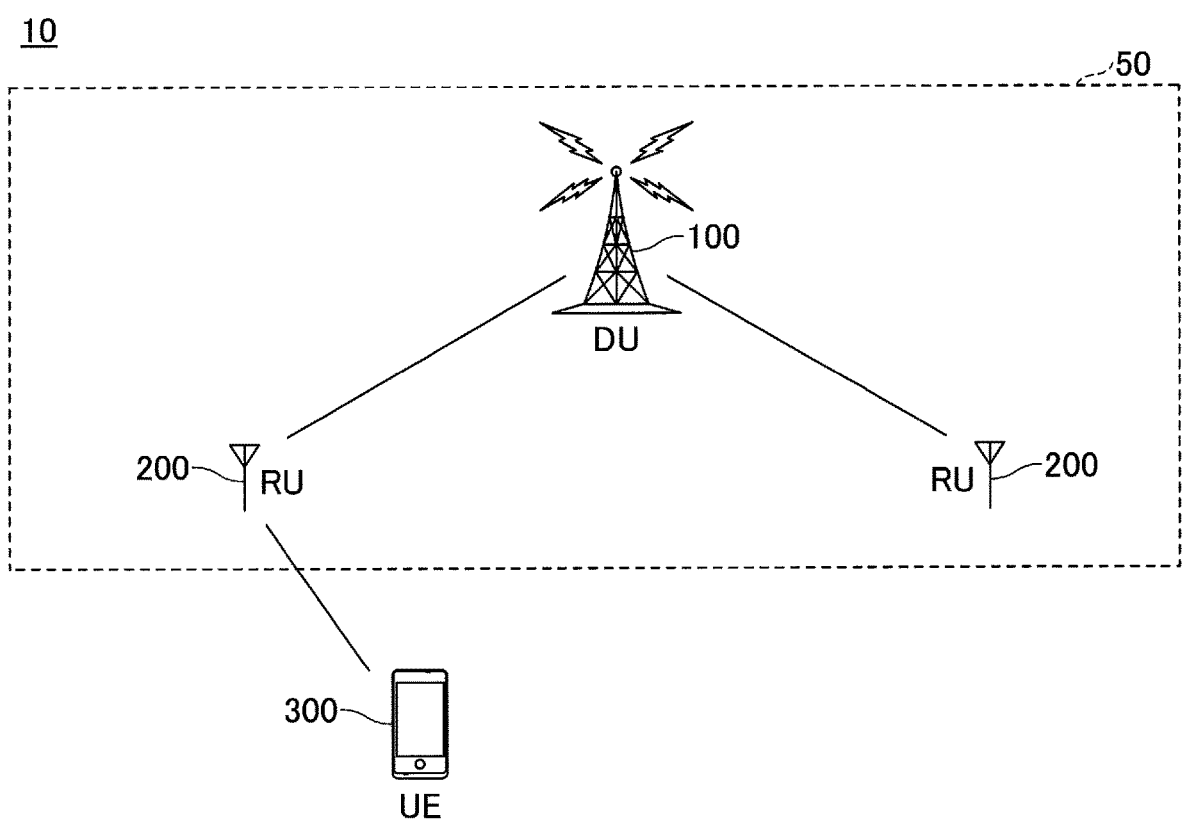
FIG. 2 is a schematic diagram illustrating a radio communication system according to an embodiment of the invention.

First, a radio communication system according to an embodiment of the invention will be described with reference to FIG. 2. FIG. 2 is a schematic diagram illustrating the radio communication system according to the embodiment of the invention.

As illustrated in FIG. 2, a radio communication system 10 includes a user equipment 300 and a radio network control system 50 including a DU 100 and an RU 200. The radio communication system 10 may be, for example, any radio communication system in conformity to 3rd generation partnership project (3GPP) such as an LTE system, an LTE-advanced system, or a 5G system. In the illustrated embodiment, only one DU 100 is illustrated, but many DUs 100 are disposed to cover a service area of the radio communication system 10. In the illustrated embodiment, the DU 100 is communicatively connected to two RUs 200, but the invention is not limited thereto. The DU 100 may be communicatively connected to any number of RUs 200.

The DU 100 is communicatively connected to one or more RUs 200 via a fronthaul to communicate with a user equipment 300 via the RU 200. In the following embodiment, the DU 100 has functions of Layers 2 and 3 including a scheduling function, but the invention is not limited thereto. The DU 100 may not have some of the functions of Layers 2 and 3 other than the scheduling function. Here, Layer 1 is synonymous with a physical layer, Layer 2 includes a MAC sublayer, an RLC sublayer, and a PDCP sublayer, and Layer 3 includes a radio resource control (RRC) layer. The DU 100 may be referred as a central unit (CU), a central digital unit (CDU), a central aggregate apparatus, a central base station, and the like. Alternatively, the DU 100 may be referred simply as a base station (enhanced Node B: eNB).

Figure 3:
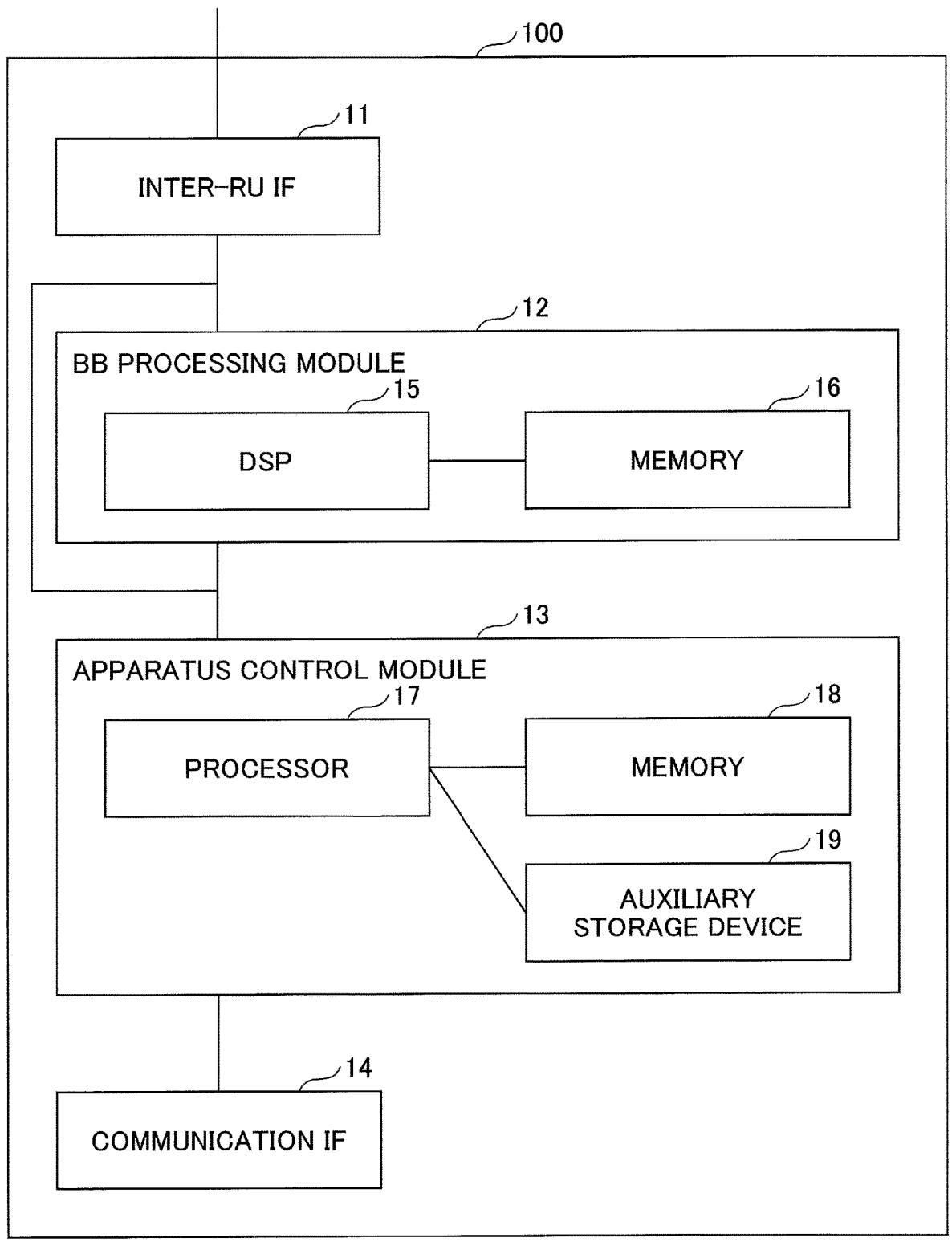
FIG. 3 is a block diagram illustrating a hardware configuration of a DU according to the embodiment of the invention.

As illustrated in FIG. 3, the DU 100 includes an inter-RU interface (IF) 11, a baseband (BB) processing module 12, an apparatus control module 13, and a communication interface (IF) 14.

The inter-RU interface 11 is an interface for communication connection with the RU 200 and is connected to a physical circuit of a fronthaul (FR) connecting the DU 100 to the RU 200 to terminate a protocol used for the FH.

The baseband processing module 12 converts an internet protocol (IP) packet into a signal exchanged with the RU 200, and vice versa. The baseband processing module 12 includes a digital signal process (DSP) 15 that performs signal processing and a memory 16 for the DSP 15.

The apparatus control module 13 performs a scheduling process to be described below and various processes such as generation of various kinds of information and packets in the DU 100. The apparatus control module 13 includes a processor 17 that performs a process in the apparatus control module 13, a memory 18 for the processor 17, and an auxiliary storage device 19 that stores various programs and data used for the DU 100 to operate.

The communication interface (IF) 14 is an interface for connection with a core network, another DU 100, and another apparatus.

The RU 200 is communicatively connected to the DU 100 via the fronthaul and performs radio communication with the user equipment 300. The DU 100 and the RU 200 mutually perform communication according to a protocol used for the FH. In the following embodiment, the RU 200 has functions of Layer 1 and the RF function, but the invention is not limited thereto. The RU 200 may further have some of the functions of Layer 2 and Layer 3. The RU 200 may be referred as a remote radio unit (RRU), a remote radio antenna (RRA), a remote radio head (RRH), or a remote base station. Alternatively, the RU 200 may be referred simply as a base station.

Figure 4:
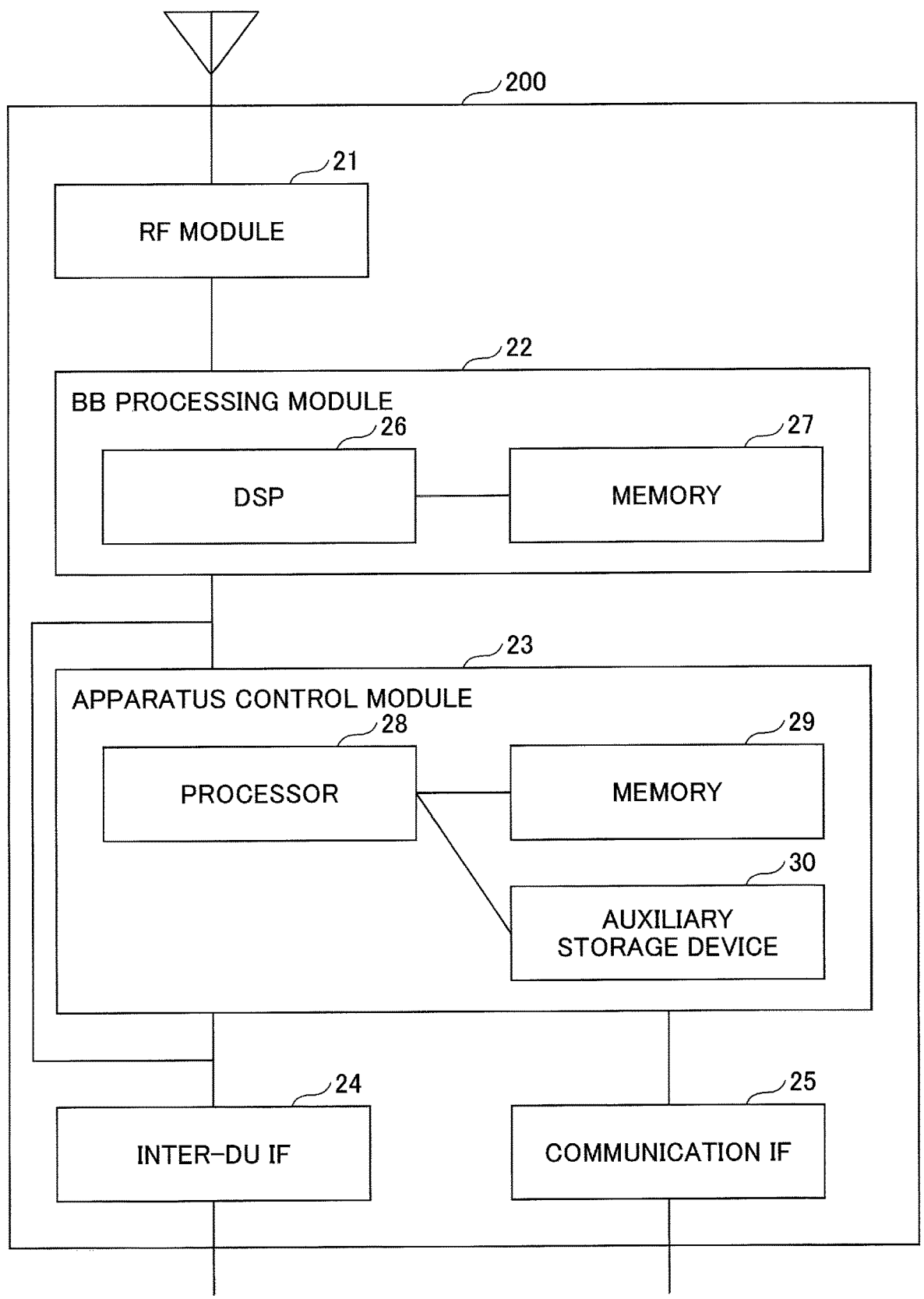
FIG. 4 is a block diagram illustrating a hardware configuration of an RU according to the embodiment of the invention.

As illustrated in FIG. 4, the RU 200 includes an RF module 21, a baseband processing module 22, an apparatus control module 23, an inter-DU interface (IF) 24, and a communication interface (IF) 25.

The RF module 21 implements an RF function to generate a radio signal to be transmitted from an antenna by performing digital-to-analog (D/A) conversion, modulation, frequency conversion, and power amplification, and the like on a digital baseband signal received from the baseband processing module 22. The RF module 21 generates a digital baseband signal by performing frequency conversion, analog-to-digital (A/D) conversion, demodulation, and the like on a received radio signal and delivers the digital baseband signal to the baseband processing module 22.

The baseband processing module 22 converts a signal transmitted or received to and from the DU 100 via the inter-DU IF 24 into a digital baseband signal, and vice versa. The baseband processing module 22 includes a DSP 26 that performs signal processing and a memory 27 for the DSP 26.

The apparatus control module 23 performs various processes in the RU 200, such as generation and extraction processes on various kinds of information to be described below. The apparatus control module 23 includes a processor 28 that performs a process in the apparatus control module 23, a memory 29 for the processor 28, and an auxiliary storage device 30 that stores various programs and data used for the RU 200 to operate.

The inter-DU interface 24 is an interface for communication connection with the DU 100 and is connected to a physical circuit of a fronthaul (FR) connecting the DU 100 to the RU 200 to terminate a protocol used for the FH.

The communication interface 25 is an interface for connection with another apparatus.

The user equipment 300 transmits and receives radio signals to and from the RU 200 via a cell provided by the RU 200. Typically, as illustrated, the user equipment 300 may be any appropriate information processing apparatus that has a wireless communication function, such as a smartphone, a mobile phone, a tablet, a mobile router, or a wearable terminal.

Figure 5:
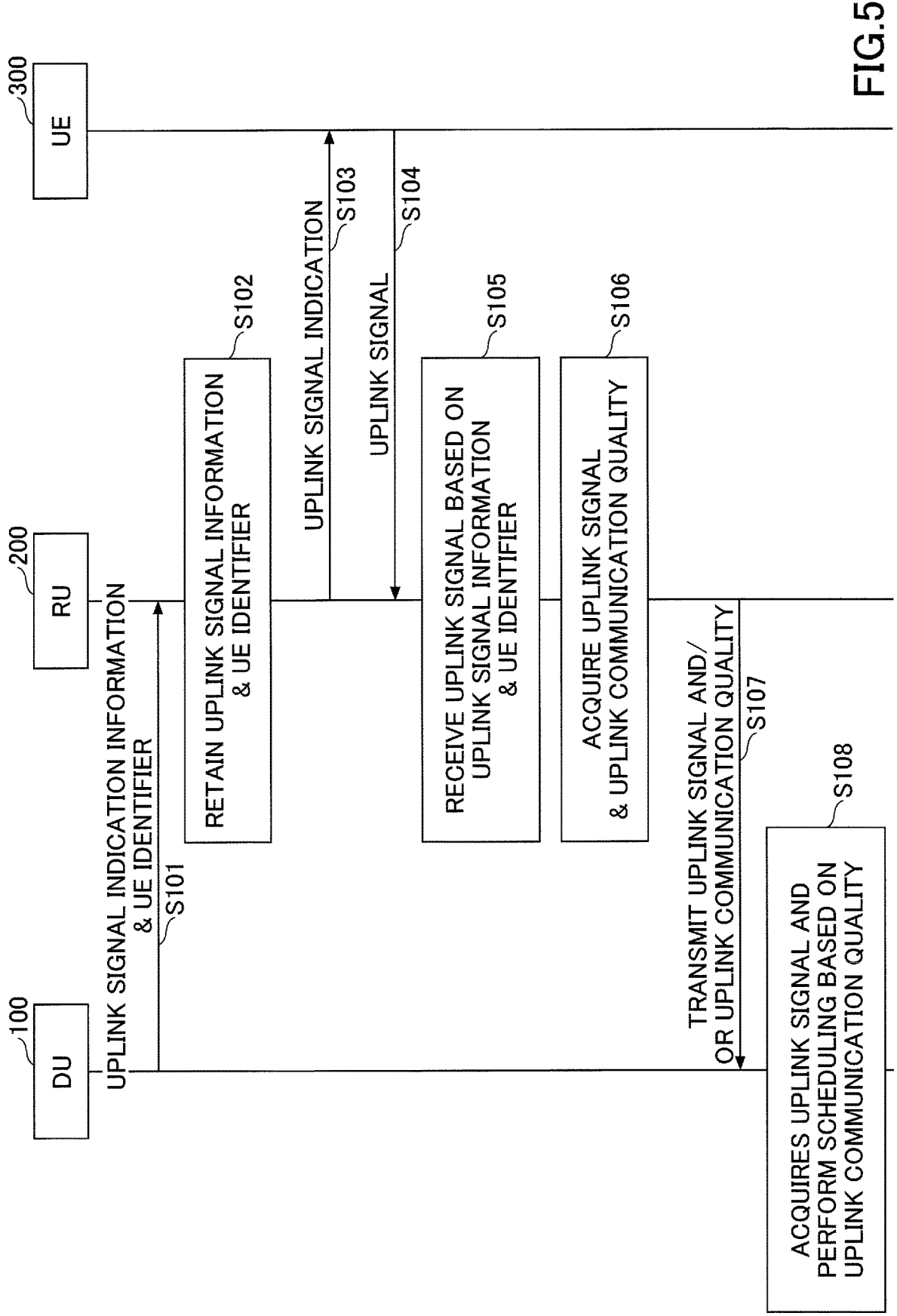
FIG. 5 is a sequence diagram illustrating an uplink transmission process according to the embodiment of the invention.

Next, interface processing between the DU and the RU according to an embodiment of the invention will be described with reference to FIG. 5. FIG. 5 is a sequence diagram illustrating an uplink transmission process according to the embodiment of the invention. The uplink transmission process starts by scheduling resources for uplink transmission to the user equipment 300 by the DU 100, for example, in response to a scheduling request for uplink transmission received from the user equipment 300 via the RU 200.

As illustrated in FIG. 5, in step S101, the DU 100 transmits uplink signal indication information for the user equipment 300 and an identifier of the user equipment 300 to the RU 200. That is, to indicate, to the user equipment 300, an uplink grant, the DU 100 adds an identifier of the user equipment 300 to the uplink signal indication information for providing an indication of the uplink transmission and transmits the uplink signal indication information to which the identifier is added, to the RU 200.

Here, the uplink signal indication information includes uplink signal information indicating resources scheduled for the user equipment 300, a transmission scheme, and the like. For example, the uplink signal information may include one or more pieces of timing information and frequency information of uplink transmission from the user equipment 300. Specifically, the uplink signal information may be transmission carrier information, presence or absence of frequency hopping, a frequency allocation position, a modulation and coding scheme (MCS), a redundancy version (RV), a flag indicating new data or not, coding information including cyclic shift and code multiplexing, or information regarding presence or absence of a channel state information (CSI) request. However, the uplink signal information according to the invention is not limited thereto and may include any information used for the user equipment 300 to perform uplink transmission.

The identifier of the user equipment 300 may be, for example, a cell-radio network temporary identifier (C-RNTI), a semi-persistent scheduling (SPS) C-RNTI, a control channel element (CCE) index of a scheduled physical downlink control channel (PDCCH), an SAE-temporary mobile subscriber identity (S-TMSI), an international mobile subscriber identity (IMSI), an index value associated with a PDCCH transmitted by the DU 100, or implicit identification information used in an eNB. When the DU 100 sets SPS or repetition transmission in the user equipment 300, a PDCCH for transmitting an uplink grant to the user equipment 300 is not scheduled in each transmission opportunity subsequent to second transmission. In this case, the user equipment 300 may be specified based on a frequency allocation position, an allocation timing, and the like.

In step S102, the RU 200 receives the identifier of the user equipment 300 and the uplink signal indication information transmitted from the DU 100 and retains the uplink signal information and the identifier extracted from the received uplink signal indication information. The uplink signal information and the identifier are retained in the RU 200 to be used for subsequent reception of an uplink signal from the user equipment 300.

In step S103, the RU 200 transmits an uplink indication signal to the user equipment 300. Specifically, the RU 200 may transmit an uplink grant to the user equipment 300 using a PDCCH allocated by the DU 100.

In step S104, the user equipment 300 transmits an uplink signal to the RU 200 according to the received uplink signal indication. Specifically, the user equipment 300 transmits the uplink signal to the RU 200 using a physical uplink shared channel (PUSCH) designated in the uplink grant transmitted by the RU 200.

In step S105, the RU 200 receives the uplink signal transmitted from the user equipment 300 based on one or both of the retained uplink signal information and identifier. Specifically, the RU 200 specifies the uplink signal received from the user equipment 300 using the PUSCH based on a frequency and/or a reception timing designated by the uplink signal information retained in step S102 and the identifier of the user equipment 300.

In step S106, the RU 200 extracts data information from the uplink signal from the user equipment 300 and estimates uplink communication quality based on the uplink signal. Specifically, the RU 200 extracts data information (U-plane data) of the user equipment 300 from the received uplink signal based on the retained identifier of the user equipment 300. When the uplink signals are received from the plurality of user equipments 300, the RU 200 may extract data information for user equipments based on the identifiers of the user equipments 300.

Further, for example, the RU 200 may estimate uplink communication quality between the user equipment 300 and the RU 200 from a reference signal included in the uplink signal. Specifically, the user equipment 300 transmits an uplink signal including a demodulation reference signal (DMRS) to the RU 200. Then, the RU 200 estimates a precoding matrix indicator (PMI), a reception signal-to-interference ratio (SIR), and the like from the received MDRS. The PMI is a PMI of the uplink signal. However, in the case of time division duplex (TDD), the PMI may be a PMI of a downlink signal.

In step S107, the RU 200 transmits one or both of the extracted data information and the estimated uplink communication quality to the DU 100. Specifically, the RU 200 transmits the extracted data information (U-plane data) of the user equipment 300, the estimated PMI, the reception SIR, and the like to the DU 100. For example, when the RU 200 has a decoding processing function, the data information may be decoded data (a bit string signal), likelihood information, or the like. Conversely, when the RU 200 has not decoding processing function, the data information may be I/Q data or a baseband signal received from the user equipment 300. Whenever the RU 200 receives an uplink signal from the user equipment 300, the RU 200 may transmit data information to the DU 100 or may retain data information received for a given period from the user equipment 300 and collect and transmit the retained data information to the DU 100 after elapse of the period.

The RU 200 transmits, to the DU 100, uplink communication quality such as the PMI and the reception SIR in accordance with an I/Q data value, a quantized value of an I/Q data value, a predefined index value, or the like. The RU 200 may manage uplink communication quality as communication quality of an entire band or may manage uplink communication quality as communication quality of a resource block unit higher than granularity. Whenever an uplink signal is received from the user equipment 300, the RU 200 may transmit uplink communication quality or may estimate uplink communication quality based on the uplink signal received for a given period from the user equipment 300 and transmit the estimated uplink communication quality to the DU 100 after elapse of the period.

In step S108, the DU 100 receives one or both of the data information and the uplink communication quality and schedules subsequent uplink transmission for the user equipment 300 based on the received uplink communication quality. For example, when the received data information is transmitted to a transmission destination apparatus via the core network and transmission target uplink data is present in the user equipment 300, the DU 100 performs subsequent scheduling for the user equipment 300 based on the received uplink communication quality.

In the SPS or the repetition transmission, the DU 100 does not transmit the uplink signal indication information to the RU 200 at each transmission opportunity of the user equipment 300. For example, when the SPS is set in the user equipment 300, the DU 100 may transmit the SPS C-RNTI to the RU 200 as the identifier of the user equipment 300 along with SPS-relevant information indicating a transmission period of the SPS set in the user equipment 300, transmission resources, or the like in the above-described step S101. When the SPS-relevant information and the SPS C-RNTI are received, the RU 200 recognizes that the SPS is set in the user equipment 300 in accordance with the transmission period, the transmission resources, or the like indicated in the uplink signal information and retains the received SPS-relevant information and the SPS C-RNTI in step S102. Thereafter, the RU 200 determines a transmission frequency and a transmission timing of an uplink signal from the user equipment 300 based on the SPS-relevant information and appropriately receives the uplink signal transmitted from the user equipment 300 based on the determined transmission frequency and transmission timing. When the RU 200 may not receive an uplink signal from the user equipment 300 a predetermined number of times or more at transmission opportunities allocated to the user equipment 300, the RU 200 may consider the user equipment 300 to release the SPS. Here, the predetermined number of times may be adaptively set or may be a quasi-static fixed value. When a timing advance (TA) timer of the user equipment 300 expires, the user equipment 300 may release the SPS resource and the RU 200 may consider the user equipment 300 to release the SPS.

When the repetition transmission is set in the user equipment 300, the DU 100 may transmit repetition transmission-relevant information indicating a transmission frequency position of an uplink signal, the number of repetitions, or the like in the repetition transmission set in the user equipment 300 as uplink signal information to the RU 200 in the above-described step S101. When the RU 200 receives the repetition transmission-relevant information, the RU 200 recognizes that the repetition transmission is set in the user equipment 300 and retains the received repetition transmission-relevant information and the identifier of the user equipment 300 in step S102. Thereafter, the RU 200 determines the transmission frequency position of the uplink signal and the number of repetitions from the user equipment 300 based on the repetition transmission-relevant information and appropriately receives the uplink signal transmitted from the user equipment 300 based on the determined transmission frequency position and number of repetitions. Until the RU 200 determines that the reception of the uplink signal is completed, the RU 200 may transmit, to the DU 100, an invalid value or intermittent transmission (DTX) information or may suspend the transmission to the DU 100. When the RU 200 determines that the reception of the uplink signal is completed and even when the number of repetitions of the uplink signal of the user equipment 300 transmitted from the DU 100 does not come, the RU 200 may stop a process of receiving a subsequent uplink signal and transmit a signal for providing an indication to stop an uplink signal to the user equipment 300.

Figure 6:
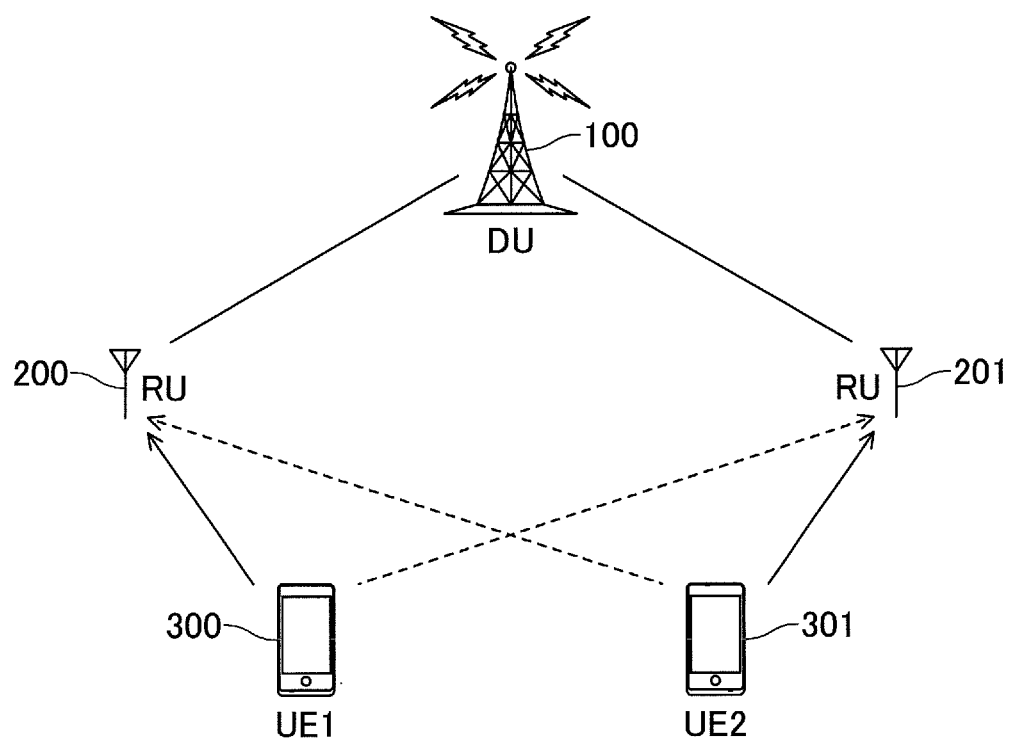
FIG. 6 is a schematic diagram illustrating a CoMP process between a DU and an RU according to the embodiment of the invention.

In an embodiment, the DU 100 may acquire data information transmitted from the user equipment 300 by applying inter-cell coordinated transmission and reception (coordinated multi-point transmission/reception: CoMP) to the RU 200 and another RU 201 and decoding an uplink signal received from the user equipment 300 via the RU 200 and an uplink signal received from the user equipment 300 via the RU 201. Specifically, as illustrated in FIG. 6, the DU 100 may perform uplink CoMP using the RU 200 and the RU 201 adjacent to the RU 200. For example, the DU 100 can acquire an uplink signal (desired signal) received in the RU 200 from the user equipment 300 and an uplink signal (interference signal) received in RU 201 from the user equipment 300 and can acquire data information in which interference is reduced by combining these uplink signals (for example, removing the interference). Information transmitted from the RUs 200 and 201 to the DU 100 may be a U-plane signal serving as an I/Q data value, channel estimation information, communication quality, or the like. The DU 100 decodes the uplink signal based on the information provided by the RUs 200 and 201. The uplink CoMP may be adaptively applied in such a manner that the DU 100 indicates, to the RUs 200 and 201, the uplink CoMP. In other words, the decoding processing functional unit may be adaptively changed between the DU 100 and the RUs 200 and 201. The indication may be transmitted using an FH frame protocol or the like. When the CoMP is not applied, the uplink transmission process described with reference to FIG. 5 may be performed.

The DU 100 may acquire data information of user equipments UE1 and UE2 by acquiring uplink signals of the user equipments UE1 and UE2 received in RU 200 and uplink signals of the user equipments UE1 and UE2 received in the RU 201 and decoding the uplink signals. That is, the DU 100 removes interference regarding the data information of the user equipment UE1 using the uplink signal of the other user equipment UE2.

In the uplink CoMP, as described above, the DU 100 may simply combine the uplink signals acquired from the RUs 200 and 201 or may adjust transmission frequencies and/or transmission timings of the user equipments UE1 and UE2. For example, when the DU 100 indicates the RU 200 to transmit an uplink signal to the user equipment UE1, the DU 100 may not indicate the RU 201 to transmit an uplink signal to the user equipment UE2. Thus, when the user equipment UE1 transmits the uplink signal, the RU 200 can receive only the desired signal from the user equipment UE1 and the RU 201 can receive only the interference signal from the user equipment UE1. As a result, the DU 100 can acquire the desired signal and the interference signal from only the user equipment UE1, and thus can acquire the data information with higher precision by performing interference removal on the acquired desired signal and interference signal. Alternatively, when the DU 100 indicates the RU 200 to transmit uplink signals to the user equipments UE1 and UE #2, the DU 100 may allocate different frequency positions to the user equipments UE1 and UE2. Thus, when the user equipments UE1 and UE2 transmit the uplink signals, the RUs 200 and 201 can receive the desired signal and the interference signal from the user equipments UE1 and UE2 at the different frequency positions. As a result, the DU 100 can acquire the desired signal and the interference signal respectively from the user equipments UE1 and UE2, and thus can acquire data information with higher precision by performing interference removal on the acquired desired signal and interference signal.

In an embodiment, the DU 100 or the RU 200 may estimate the number of transmission ranks in uplink MIMO based on the uplink communication quality estimated for the user equipment 300. Specifically, the DU 100 or the RU 200 may estimate a rank indicator (RI) optimum for the uplink MIMO based on the reception SIR estimated from the DMRS of the uplink signal transmitted from the user equipment 300 using the PUSCH. The DU 100 can subsequently schedule the PUSCH for the user equipment 300 using the estimated RI.

For example, in a case in which the RU 200 estimates an RI, the RU 200 estimates the reception SIR from the DMRS in the uplink signal transmitted from the user equipment 300 and estimates an optimum RI based on the reception SIR. For example, the RU 200 may transmit, to the DU 100, the estimated RI using the RI index. The DU 100 can schedule the PUSCH for the user equipment 300 subsequently using the estimated RI.

On the other hand, in a case in which the DU 100 estimates the RI, the DU 100 estimates an optimum RI based on the reception SIR received as the uplink communication quality from the RU 200. The DU 100 schedules the PUSCH for the user equipment 300 subsequently using the estimated RI and transmits, to the RU 200, the estimated RI, for example, using the RI index.

Figure 7:
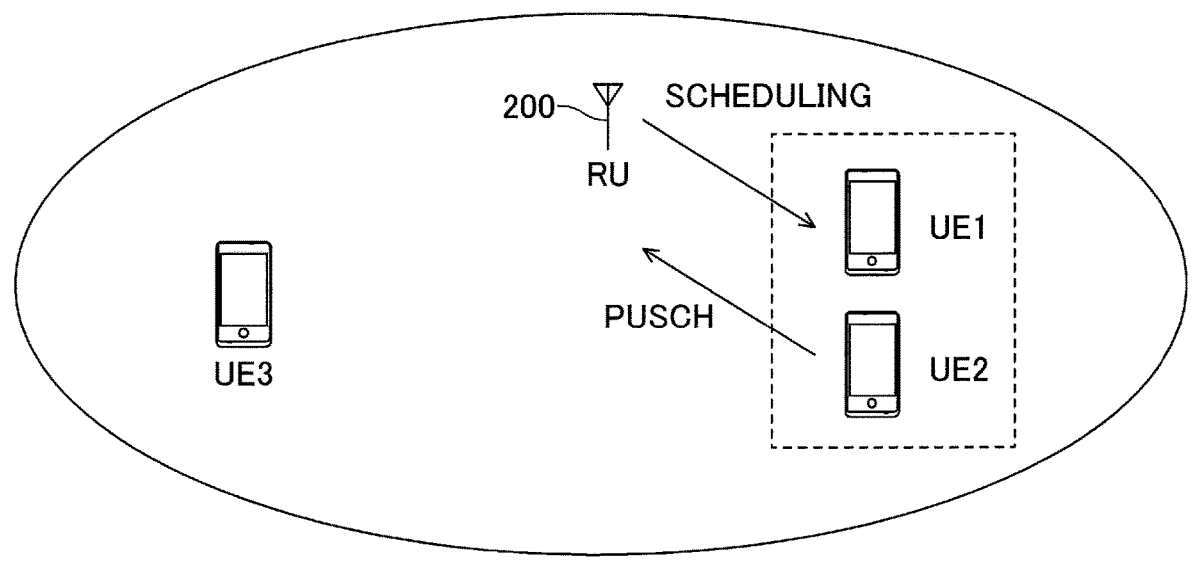
FIG. 7 is a schematic diagram illustrating UE grouping according to the embodiment of the invention.

In an embodiment, the DU 100 may estimate uplink communication quality of the user equipment UE1 based on the uplink communication quality received from the RU 200 for the other user equipment UE2 near the user equipment UE1. That is, as illustrated in FIG. 7, when uplink signals are received from a plurality of user equipments, the DU 100 may perform scheduling on the user equipment UE1 using the uplink communication quality acquired based on the uplink signal from the user equipment UE2 near the user equipment UE1.

Specifically, the DU 100 ascertains the position of each user equipment 300 in a cell of the RU 200. For example, the DU 100 may estimate the position of each user equipment 300 by ascertaining a distance and an azimuth of each user equipment 300 from the RU 200 based on timing alignment (TA) information and PMI information of each user equipment 300. For example, as illustrated in FIG. 7, the DU 100 groups the user equipments UE1 and UE2 located nearby and ascertain uplink communication quality such as frequency information of an entire band in each group based on the individual uplink communication qualities acquired from the user equipments UE1 and UE2 in the group. The DU 100 can perform scheduling for the user equipments UE1 and UE2 in the group based on the collected uplink communication quality. Thus, the DU 100 can use the uplink communication quality of the entire band, compared to the scheduling based on the individual uplink communication quality specific to each user equipment 300, and thus can perform more appropriate scheduling. Even when the uplink communication quality of the user equipment UE1 is not acquired, the DU 100 can schedule resources appropriate for the user equipment UE1 based on the uplink communication quality of the user equipment UE1.

When the DU 100 groups the plurality of user equipments 300, the DU 100 may exclude the user equipment 300 which is moving. This is because when the uplink communication quality of the user equipment 300 which is moving is applied to the stationary user equipment 300, appropriate scheduling may not be performed. Specifically, for each user equipment 300, the DU 100 may determine whether the user equipment 300 is moving based on the PMI. For example, the PMI may be estimated by the RU 200 and transmitted to the DU 100, as described above.

Figure 8:
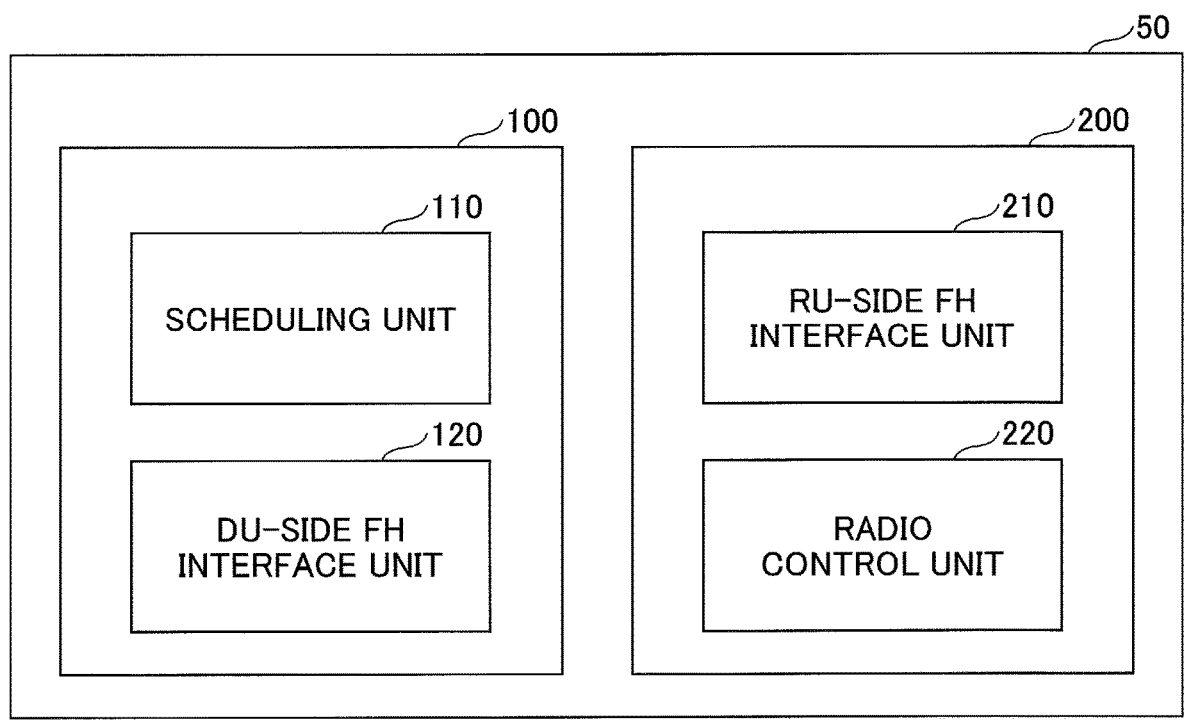
FIG. 8 is a block diagram illustrating a functional configuration of a radio network control system according to the embodiment of the invention.

Next, a radio network control system according to an embodiment of the invention will be described with reference to FIG. 8. FIG. 8 is a block diagram illustrating a functional configuration of a radio network control system according to the embodiment of the invention. As described above, the radio network control system 50 include the DU 100 that execute a scheduling function and one or more RUs 200 that is communicatively connected to the DU 100 via a fronthaul and performs a radio physical layer function. The DU 100 and the RU 200 are coordinated to realize the above-described uplink transmission process.

As illustrated in FIG. 8, the DU 100 includes a scheduling unit 110 and a DU-side fronthaul (FH) interface unit 120. The RU 200 includes an RU-side fronthaul (FH) interface unit 210 and a radio control unit 220.

The scheduling unit 110 schedules a resource for the user equipment 300. For example, the scheduling unit 110 schedules a PUSCH for the user equipment 300 in response to a scheduling request for uplink transmission received from the user equipment 300 via the RU 200. The scheduling unit 110 may perform scheduling for the user equipment 300 based on the received uplink communication quality. That is, the scheduling is performed based on the uplink communication quality between the user equipment 300 and the RU 200 acquired from the RU 200.

The scheduling unit 110 may schedule the SPS or the repetition transmission for the user equipment 300. In this case, the scheduling unit 110 may transmit, to the RU 200, SPS-relevant information or repetition transmission-relevant information via the DU-side FH interface unit 120.

The scheduling unit 110 may estimate uplink communication quality of the user equipment UE1 based on the uplink communication quality received from the RU 200 with respect to the other user equipment UE2 near the user equipment UE1 and schedule the uplink transmission for the user equipment UE1 based on the estimated uplink communication quality. Specifically, the scheduling unit 110 may estimate the position of each user equipment 300 by ascertaining a distance and an azimuth of each user equipment 300 from the RU 200 based on TA information and PMI information of each user equipment 300 and may group the user equipments UE1 and UE2. In this case, the scheduling unit 110 may derive the uplink communication quality such as frequency information of an entire band in each group and perform scheduling for the user equipments UE1 and UE2 in the group. The scheduling unit 110 may exclude the user equipment 300 which is moving from the grouping.

The DU-side FH interface unit 120 provides an interface to the RU 200. Specifically, the DU-side FH interface unit 120 transmits the uplink indication information and the identifier of the user equipment 300 to the RU-side FR interface unit 210 with respect to the uplink transmission scheduled for the user equipment 300 by the scheduling unit 110. For example, the uplink signal indication information may include uplink signal information indicating the resource, the transmission scheme, and the like scheduled for the user equipment 300. The uplink signal information may include one or more pieces of timing information and frequency information of uplink transmission from the user equipment 300. Specifically, the uplink signal information may be transmission carrier information, presence or absence of frequency hopping, a frequency allocation position, MCS, RV, a flag indicating new data or not, coding information including cyclic shift and code multiplexing, or information regarding presence or absence of a CSI request. However, the uplink signal information according to the invention is not limited thereto and may include any information used for the user equipment 300 to perform uplink transmission.

The identifier of the user equipment 300 may be, for example, a C-RNTI, a SPS C-RNTI, a CCE index of a scheduled PDCCH, an S-TMSI, an IMSI, an index value associated with a PDCCH transmitted from the DU 100, or implicit identification information used in an eNB. When scheduling unit 110 sets SPS or repetition transmission for the user equipment 300, a PDCCH for transmitting an uplink grant for the user equipment 300 is not scheduled in each transmission opportunity subsequent to second transmission. In this case, the user equipment 300 may be specified based on a frequency allocation position, an allocation timing, and the like.

When the scheduling unit 110 applies CoMP to the RUs 200 and 201, the DU-side FH interface unit 120 may acquire the data information transmitted from the user equipment 300 by decoding the uplink signal received from the user equipment 300 via the RU 200 and the uplink signal received from the user equipment 300 via the RU 201.

The RU-side FH interface unit 210 provides an interface to the DU 100. The RU-side FH interface unit 210 may receive the uplink signal instruction information and the identifier from the DU-side FH interface unit 120 and extract the uplink signal information from the uplink signal indication information. The RU-side FH interface unit 210 extracts the data information from the uplink signal from the user equipment 300 and estimates uplink communication quality based on the uplink signal, and then transmits one or both of the extracted data information and the estimated uplink communication quality to the DU-side FH interface unit 120.

For example, the RU-side FH interface unit 210 may also transmit the extracted data information (U-plane data) of the user equipment 300, the estimated PMI, the reception SIR, and the like to the DU-side FH interface unit 120. For example, the data information may be decoded data (a bit string signal), likelihood information, or the like or may be the I/Q data or the baseband signal received from the user equipment 300. Similarly, the RU-side FH interface unit 210 may transmit, to the DU-side FH interface unit 120, the estimated PMI and the reception SIR in accordance with the I/Q data value, a quantized value of the I/Q data value, a predefined index value, or the like. Whenever an uplink signal is received from the user equipment 300, the RU-side FH interface unit 210 may transmit the data information and/or the uplink communication quality to the DU-side FH interface unit 120 or may retain the data information and/or uplink communication quality received for a given period from the user equipment 300 and collect and transmit the retained data information and/or the uplink communication quality to the DU-side FH interface unit 120 after elapse of the period.

The radio control unit 220 retains the identifier and the uplink signal information extracted by the RU-side FH interface unit 210, transmits an uplink signal indication to the user equipment 300, and receives the uplink signal transmitted from the user equipment 300 based on one or both of the retain uplink signal information and identifier. Specifically, the radio control unit 220 may specify the uplink signal received from the user equipment 300 in the PUSCH based on the frequency designated with the retained uplink signal information and/or the reception timing and the identifier of the user equipment 300. Then, the radio control unit 220 extracts the data information from the uplink signal from the user equipment 300 and estimates the uplink communication quality based on the uplink signal. Specifically, the radio control unit 220 extracts the data information (the U-plane data) of the user equipment 300 from the received uplink signal based on the retained identifier of the user equipment 300. When uplink signals are received from the plurality of user equipments 300, the RU 200 may extract the data information for each user equipment based on the identifier of each user equipment 300. Further, for example, the radio control unit 220 may estimate the uplink communication quality between the user equipment 300 and the RU 200 from a reference signal included in the uplink signal. Specifically, the radio control unit 220 Specifically, the radio control unit 220 estimates the PMI, the reception SIR, or the like from the DMRS.

In the above-described embodiment, the DU 100 and the RU 200 have been referred to for the description, but the invention is not limited thereto. The embodiment can be applied to an interface between any base station that has a scheduling function and any base station that has a radio physical layer function.

Here, the block diagrams for use in the above description of embodiments show blocks for functional units. These functional blocks (components) are implemented in any combination of hardware and/or software items. Also, the implementations of the respective functional blocks are not particularly limited. In other words, the respective functional blocks may be implemented in a physically and/or logically coupled single device or in multiple devices where two or more physically and/or logically separated devices are connected directly and/or indirectly (for example, in wired and/or wireless manners).

Figure 9:
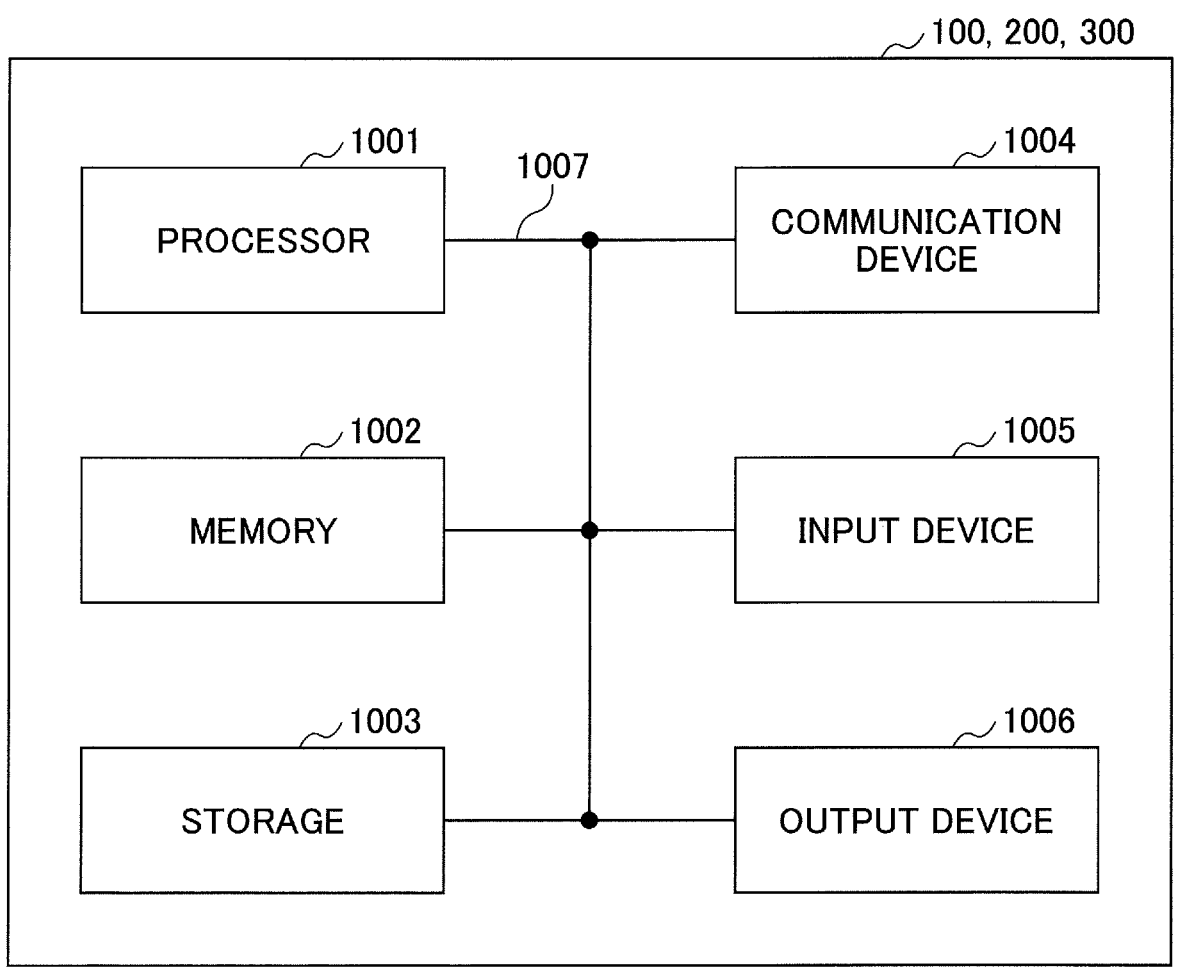
FIG. 9 is a block diagram for illustrating a hardware arrangement of base stations and a user equipment according to the embodiment of the invention.

For example, the base stations 100, 200, and the user equipment 300 according to one embodiment of the present invention may function as a computer processing the radio communication method according to the present invention. FIG. 9 is a block diagram for illustrating a hardware arrangement of the base stations 100, 200, and the user equipment 300 according to one embodiment of the present invention. The base stations 100, 200, and the user equipment 300 as stated above may each be physically arranged as a computer device including a processor 1001, a memory 1002, a storage 1003, a communication device 1004, an input device 1005, an output device 1006, a bus 1007 or the like.

Note that the language "apparatus" can be interchangeably read as a circuit, a device, a unit or the like. The hardware arrangement of the base stations 100, 200, and the user equipment 300 may each be arranged to include one or more of the illustrated devices or without including a part of the devices.

Respective functions in the base stations 100, 200, and the user equipment 300 are implemented by loading a predetermined software item (program) into hardware items such as the processor 1001 and the memory 1002 to cause the processor 1001 to execute operations, perform communication with the communication device 1004 and control read and/or write operations on data from/in the memory 1002 and the storage 1003.

The processor 1001 runs an operating system to control the whole computer, for example. The processor 1001 may be arranged with a central processing unit (CPU) including an interface with a peripheral device, a control device, a calculation device, a register and the like. For example, the above-stated components may be implemented in the processor 1001.

Also, the processor 1001 loads programs (program codes), software modules and data from the storage 1003 and/or the communication device 1004 into the memory 1002 and executes various operations in accordance with them. As the programs, programs for causing the computer to perform at least a part of operations as described in the above embodiments are used. For example, operations by the components in the base stations 100, 200, and the user equipment 300 may be implemented with control programs stored in the memory 1002 and executed by the processor 1001, and other functional blocks may be similarly implemented. It has been described that the above-stated various operations are performed by the single processor 1001, but they may be performed with two or more processors 1001 simultaneously or sequentially. The processor 1001 may be implemented with one or more chips. Note that the programs may be transmitted from a network via an electric communication line.

The memory 1002 is a computer-readable storage medium and may be arranged with at least one of a ROM (Read Only Memory), an EPROM (Erasable Programmable ROM), an EEPROM (Electrically Erasable Programmable ROM), a RAM (Random Access Memory) or the like, for example. The memory 1002 may be referred to as a register, a cache, a main memory (main storage device) or the like. The memory 1002 can store programs (program codes), software modules or the like that can be executed to implement the radio communication method according to one embodiment of the present invention.

The storage 1003 is a computer-readable storage medium and may be arranged with at least one of an optical disk such as a CD-ROM (Compact Disc ROM), a hard disk drive, a flexible disk, a magnetic optical disk (for example, a compact disk, a digital versatile disk, a Blu-ray (registered trademark) disk), a smart card, a flash memory (for example, a card, a stick, a key drive), a floppy (registered trademark), a magnetic strip or the like. The storage 1003 may be referred to as an auxiliary storage device. The above-stated storage medium may be a database or a server including the memory 1002 and/or the storage 1003 or any other appropriate medium.

The communication device 1004 is a hardware item (transceiver device) for communication over computers via a wired and/or wireless network and may be also referred to as a network device, a network controller, a network card, a communication module or the like. For example, the above-stated components may be implemented in the communication device 1004.

The input device 1005 is an input device for receiving external inputs (for example, a keyboard, a mouse, a microphone, a switch, a button, a sensor or the like). The output device 1006 is an output device for providing external outputs (for example, a display, a speaker, a LED ramp or the like). Note that the input device 1005 and the output device 1006 may be integrally arranged (for example, a touch panel).

Also, the respective devices such as the processor 1001 and the memory 1002 are connected with each other via the bus 1007 for communicating information. The bus 1007 may be arranged with a single bus or different buses for different devices.

Also, the base stations 100, 200, and the user equipment 300 may be arranged to include a hardware item such as a macro processor, a digital signal processor (DSP), an ASIC (Application Specific Integrated Circuit), a PLD (Programmable Logic Device), a FPGA (Field Programmable Gate Array) or the like, and a part or all of the functional blocks may be implemented in the hardware item. For example, the processor 1001 may be implemented with at least one of these hardware items.

Transmission of information is not limited to the embodiments/implementations as described in the present specification and may be made in any other manner. For example, information may be transmitted in physical layer signaling (for example, DCI (Downlink Control Information) and UCI (Uplink Control Information)), upper layer signaling (for example, RRC (radio Resource Control) signaling, MAC (medium Access Control) signaling, broadcast information (MIB (master Information Block) and SIB (System Information Block)) or any other signal or combinations thereof. Also, the RRC signaling may be referred to as an RRC message and may be an RRC Connection Setup message, an RRC Connection Reconfiguration message or the like.

The respective embodiments/implementations as described in the present specification may be applied to systems using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark) or any other appropriate system or next-generation systems enhanced based on them.

Procedures, sequences, flowcharts or the like of the respective embodiments/implementations as described in the present specification may be permutable, as long as there is not inconsistency. For example, for methods as described in the present specification, various steps are presented in an exemplary order, and the present invention is not limited to the presented certain order.

Certain operations performed by the base stations 100 and 200 as described in the present specification may be performed by its upper node in some cases. In a network including one or more network nodes having base stations, various operations performed to communicate with terminals may be apparently performed by the base stations and/or network nodes other than the base stations (for example, a MME or an S-SW can be assumed, but the network nodes are not limited to them). Although it has been described that the single network node other than the base stations is used in the above example, combinations of multiple other network nodes (for example, an MME and an S-GW) may be used.

Information and others may be output from an upper layer (or a lower layer) to a lower layer (or an upper layer). They may be input and output via multiple network nodes.

Incoming and outgoing information and others may be stored in a certain location (for example, a memory) and/or managed in a management table. The incoming and outgoing information and others may be overwritten, updated or added. The outgoing information and others may be deleted. The incoming information and others may be transmitted to other device.

Determination may be made with a one-bit value (0 or 1), a Boolean value (true or false) or numerical comparison (for example, comparison with a predetermined value).

The embodiments/implementations as described in the present specification may be used singularly or in combinations or switched in connection with execution. Also, indication of predetermined information (for example, indication "it is X") is not limited to explicit manners and may be performed implicitly (for example, the predetermined information is not indicated).

Although the present invention has been described in detail, it is apparent to those skilled in the art that the present invention is not limited to the embodiments as described in the present specification. The present invention can be implemented as modifications and variations without departing from the sprit and scope of the present invention as defined in claims. Thus, the description in the present specification is intended for exemplary description and does not mean any restriction to the present invention.

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function or the like regardless of the software being referred to as software, a firmware, a middleware, a microcode, a hardware descriptive language or other names.

Also, the software, the instruction or the like may be transmitted and received via a transmission medium. For example, if the software is transmitted from a website, a server or other remote sources by using wired techniques such as a coaxial cable, an optical fiber cable, a twist pair and a digital subscriber line (DSL) and/or wireless techniques such as infrared, radio frequency and microwave, these wired techniques and/or wireless techniques are included within definition of a transmission medium.

Information, signals or the like as described in the present specification may be represented with use of any of various different techniques. For example, data, an instruction, a command, information, a signal, a bit, a symbol, a chip and so on referred to throughout the above description may be represented with a voltage, a current, an electromagnetic wave, a magnetic field, a magnetic particle, an optical field, a photon or any combination thereof.

Note that terminologies described in the present specification and/or terminologies required to understand the present specification may be replaced with terminologies having the same or similar meanings. For example, a channel and/or a symbol may be a signal. Also, the signal may be a message. Also, a component carrier (CC) may be referred to as a carrier frequency, a cell or the like.

The terminologies "system" and "network" for use in the present specification are interchangeably used.

Also, information, a parameter and so on as described in the present specification may be represented with an absolute value, a relative value from a predetermined value or other corresponding information. For example, a radio resource may be specified with an index.

Names as used for the above-stated parameters are not restrictive from any standpoint. Furthermore, there are some cases where formulae and so on using these parameters may be different from ones as explicitly disclosed in the present specification. Various channels (for example, a PUCCH, a PDCCH or the like) and information elements (for example, a TPC or the like) can be identified with any preferred names, and the various names assigned to these various channels and information elements are not restrictive from any standpoint.

A base station can accommodate one or more (for example, three) cells (also referred to as sectors). If the base station accommodates multiple cells, the whole coverage area of the base station can be segmented into multiple smaller areas, and the respective smaller areas can provide communication services with a base station subsystem (for example, indoor small base station RRH: Remote Radio Head). The terminology "cell" or "sector" indicates a part or whole of the coverage area of the base station providing communication services in the coverage and/or the base station subsystem. Furthermore, the terminologies "base station", "eNB", "cell" and "sector" can be interchangeably used in the present specification. The base station may be referred to as terminologies such as a fixed station, a NodeB, an eNodeB (eNB), an access point, a femtocell and a small cell.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or any other appropriate terminologies.

There are some cases where terminologies "determining" as used in the present specification may include various operations. The "determining" may include calculating, computing, processing, deriving, investigating, looking up (for example, looking up a table, a database or other data structures) and ascertaining, for example. Also, the "determining" may include receiving (for example, receiving information), transmitting (for example, transmitting information), inputting, outputting and accessing (for example, accessing data in a memory). Also, the "determining" may include resolving, selecting, choosing, establishing, comparing or the like. In other words, the "determining" may include any operation.

The terminologies "connected", "coupled" or all variations thereof mean direct or indirect connection or coupling between two or more elements and can include existence of one or more intermediate elements between two mutually "connected" or "coupled" elements. The coupling or connection between elements may be physical, logical or in combinations thereof. If they are used in the present specification, it can be considered that two elements are mutually "connected" or "coupled" with use of one or more electric wires, cables and/or print electric connections and as several non-limiting and non-comprehensive examples, with use of electromagnetic energy such as electromagnetic energy having a wavelength of a radio frequency domain, a microwave domain and an optical (both visible and invisible) domain.

A reference signal can be omitted as a RS (Reference Signal) and may be referred to as a pilot depending on applied standards.

The recitation "based on" as used in the present specification does not mean "only based on", unless specifically stated otherwise. In other words, the recitation "based on" means both "only based on" and "at least based on".

Any reference to elements with use of terminologies such as "first", "second" and so on as used in the present specification does not limit the amount or order of these elements in general. These terminologies can be used in the present specification as convenient manners for distinguishing between two or more elements. Accordingly, the reference to the first and second elements does not mean that only the two elements are used there or the first element has to precede the second element in any fashion.

The terminology "means" in an arrangement of each apparatus as stated above may be replaced with "unit", "circuit", "device" or the like.

As long as the terminologies "include", "including" and variations thereof are used in the present specification or claims, these terminologies are intended to be inclusive similar to the terminology "comprising". Furthermore, the terminology "or" as used in the present specification or claims is intended not to be an exclusive OR.

A radio frame may be arranged with one or more frames in a time domain. In the time domain, one or more frames each may be referred to as a subframe. The subframe may be further arranged with one or more slots in the time domain. The slot may be further arranged with one or more symbols (OFDM symbols, SC-FDMA symbols and so on) in the time domain. Any of the radio frame, the subframe, the slot and the symbol represents a time unit for transmitting signals. The radio frame, the subframe, the slot and the symbol may be referred to in other corresponding manners. For example, in LTE systems, a base station performs scheduling to assign radio resources (frequency bandwidths, transmission power and so on available in the mobile station) to mobile stations. The minimum time unit for scheduling may be referred to as a TTI (Transmission Time Interval). For example, one subframe, multiple contiguous subframes or one slot may be referred to as the TTI. A resource block (RB) may be a resource assignment unit in the time domain and the frequency domain and may include one or more contiguous subcarriers in the frequency domain. Also, in the time domain, the resource block may include one or more symbols and have one slot, one subframe or one TTI in length. The single TTI and subframe each may be arranged with one or more resource blocks. The above-stated arrangement of radio frame is merely exemplary, and the number of subframes in the radio frame, the number of slots in the subframe, the number of symbols and resource blocks in the slot and the number of subcarriers in the resource block can be changed in any manner.

Although the embodiments of the present invention have been described in detail, the present invention is not limited to the above-stated specific embodiments, and various modifications and variations can be made within the spirit of the present invention as recited in claims.

The present application is based on and claims priority to Japanese patent application No. 2016-078502 filed on Apr. 8, 2016, the entire contents of which are hereby incorporated by reference.

EXPLANATIONS OF LETTERS OR NUMERALS

10 radio communication system
50 radio network control system
100 digital unit (DU)
200 remote unit (RU)
300 user equipment

The invention claimed is:

1. A method comprising:
transmitting, by a central aggregate apparatus, uplink signal indication information for a user equipment including uplink signal information and an identifier of the user equipment to an extension apparatus;
retaining, by the extension apparatus, the identifier and the uplink signal information extracted from the received uplink signal indication information;
transmitting, by the extension apparatus, an uplink signal indication to the user equipment;
receiving, by the extension apparatus, an uplink signal transmitted from the user equipment based on one or both of the retained uplink signal information and identifier;
extracting, by the extension apparatus, data information from the uplink signal;
estimating, by the extension apparatus, uplink communication quality based on the uplink signal;
transmitting, by the extension apparatus, one or both of the extracted data information and the estimated uplink communication quality to the central aggregate apparatus; and
receiving, by the central aggregate apparatus, one or both of the data information and the uplink communication quality from the extension apparatus,
wherein the method is an interface method performed between the central aggregate apparatus and the extension apparatus.

2. The method according to claim 1,
wherein the uplink signal information includes one or more pieces of frequency information and timing information of uplink transmission from the user equipment.

3. The method according to claim 1, further comprising:
scheduling, by the central aggregate apparatus, the uplink transmission for the user equipment based on the received uplink communication quality.

4. The method according to claim 1, further comprising:
acquiring, by the central aggregate apparatus, the data information transmitted from the user equipment by applying coordinated multi-point transmission/reception (CoMP) to the extension apparatus and another extension apparatus and decoding an uplink signal received from the user equipment via the extension apparatus and an uplink signal received from the user equipment via the other extension apparatus.

5. The method according to claim 1,
wherein the central aggregate apparatus estimates uplink communication quality of the user equipment based on uplink communication quality received from the extension apparatus with respect to another user equipment near the user equipment.

6. The method according to claim 2, further comprising:
scheduling, by the central aggregate apparatus, the uplink transmission for the user equipment based on the received uplink communication quality.

7. The method according to claim 2, further comprising:
acquiring, by the central aggregate apparatus, the data information transmitted from the user equipment by applying coordinated multi-point transmission/reception (CoMP) to the extension apparatus and another extension apparatus and decoding an uplink signal received from the user equipment via the extension apparatus and an uplink signal received from the user equipment via the other extension apparatus.

8. The method according to claim 3, further comprising:
acquiring, by the central aggregate apparatus, the data information transmitted from the user equipment by applying coordinated multi-point transmission/reception (CoMP) to the extension apparatus and another extension apparatus and decoding an uplink signal received from the user equipment via the extension apparatus and an uplink signal received from the user equipment via the other extension apparatus.

9. The method according to claim 2,
wherein the central aggregate apparatus estimates uplink communication quality of the user equipment based on uplink communication quality received from the extension apparatus with respect to another user equipment near the user equipment.

10. The method according to claim 3,
wherein the central aggregate apparatus estimates uplink communication quality of the user equipment based on uplink communication quality received from the extension apparatus with respect to another user equipment near the user equipment.

11. The method according to claim 4,
wherein the central aggregate apparatus estimates uplink communication quality of the user equipment based on uplink communication quality received from the extension apparatus with respect to another user equipment near the user equipment.

12. A radio network control system comprising:
a central aggregate apparatus configured to execute a scheduling function; and
an extension apparatus configured to perform a radio physical layer function,
wherein the central aggregate apparatus includes
a scheduling unit configured to schedule a resource for a user equipment, and
a first fronthaul interface unit configured to provide an interface to the extension apparatus,
wherein the extension apparatus includes
a second fronthaul interface unit configured to provide an interface to the central aggregate apparatus, and
a radio control unit configured to control radio communication with the user equipment,
wherein the first fronthaul interface unit transmits uplink signal indication information and an identifier of the user equipment to the second fronthaul interface unit with respect to uplink transmission scheduled for the user equipment by the scheduling unit,
wherein the second fronthaul interface unit receives the uplink signal indication information and the identifier and extracts uplink signal information from the uplink signal indication information,
wherein the radio control unit retains the extracted uplink signal information and the identifier, transmits an uplink signal indication to the user equipment, and receives an uplink signal transmitted from the user equipment based on one or both of the retained uplink signal information and identifier,
wherein the second fronthaul interface unit extracts data information from the uplink signal, estimates uplink communication quality based on the uplink signal, and transmits one or both of the extracted data information and the estimated uplink communication quality to the first fronthaul interface unit, and
wherein the first fronthaul interface unit receives one or both of the data information and the uplink communication quality from the extension apparatus.

* * * * *